No. 666,085. Patented Jan. 15, 1901.
R. H. CLOUGHLEY.
MOTOR VEHICLE.
(Application filed June 2, 1900.)
(No Model.)
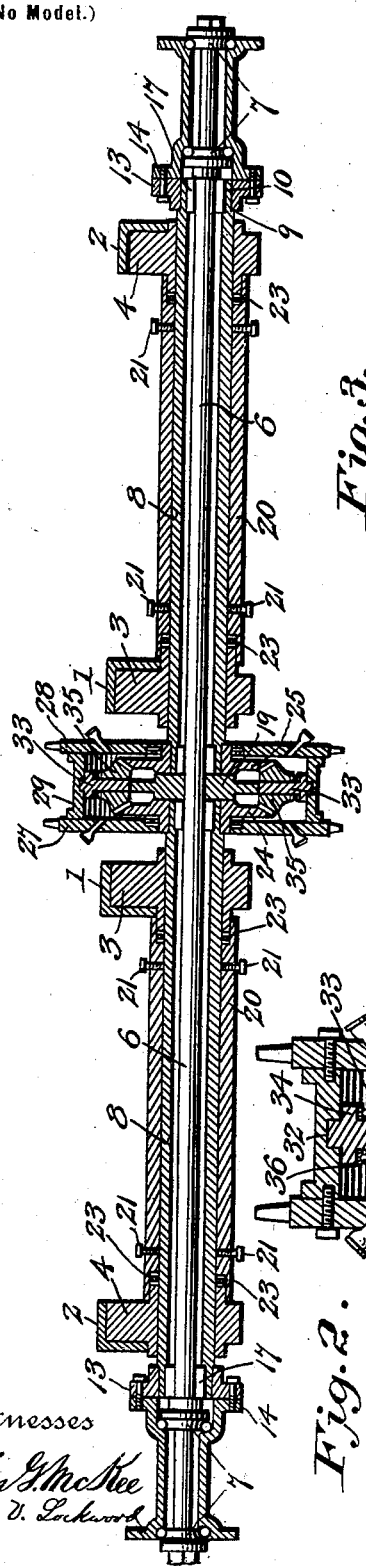
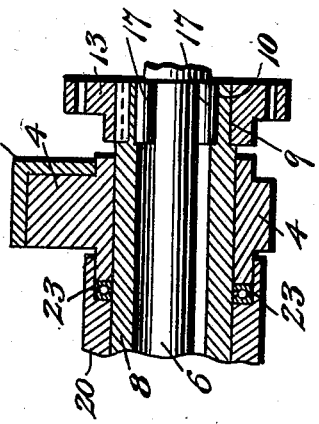
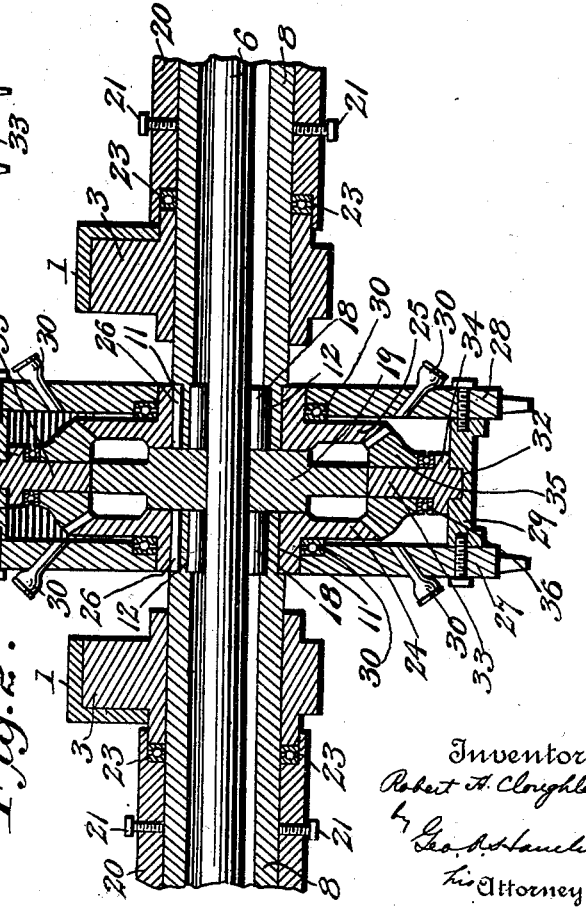
Witnesses
Edwin G. McKee
Sarah V. Lockwood
Inventor
Robert H. Cloughley
by Geo. A. Hanlin
his Attorney
THE NORRIS PETERS CO., PHOTO-LITHO., WASHINGTON, D. C.

UNITED STATES PATENT OFFICE.

ROBERT H. CLOUGHLEY, OF PARSONS, KANSAS.

MOTOR-VEHICLE.

SPECIFICATION forming part of Letters Patent No. 666,085, dated January 15, 1901.

Application filed June 2, 1900. Serial No. 18,849. (No model.)

*To all whom it may concern:*

Be it known that I, ROBERT H. CLOUGHLEY, a citizen of the United States, residing at Parsons, in the county of Labette and State of Kansas, have invented certain new and useful Improvements in Motor-Vehicles; and I do hereby declare the following to be a full, clear, and exact description of the invention, such as will enable others skilled in the art to which it appertains to make and use the same.

My invention relates to motor-vehicles, and more particularly to the driving system and compensating gearing.

One object of the present invention is the provision of ball-bearings for the driving-wheels, giving such a mounting for said wheels in relation to the driving system that the friction and heavy strain put upon the axles and compensating gearing commonly existing in motor-vehicles when turning a corner or circling around will be entirely obviated, thereby insuring great mobility with a minimum amount of friction and strain on all the operating parts.

Another object is the provision of an improved axle construction which will prevent all sticking and binding not only when the vehicle is moving straight ahead, but also when the compensating mechanism is in use, and which will insure perfect freedom of action in said compensating mechanism, reducing friction and strains therein. To accomplish this object, I construct the axle in different parts in an improved and novel manner and provide improved means for preventing longitudinal play of the parts, thrust antifriction devices, and dust-excluding means.

A further object is to equalize the pull on the compensating gearing and to minimize the size and weight thereof, as well as to insure continuous action in case of injury or breakage of the power-transmitting means. To accomplish this object and provide a convenient drum for a friction brake-band, I provide a pair of sprockets and position the compensating mechanism between them, employing two chains from the speed mechanism for the respective sprockets. With this construction when the brake is applied the strain is much less in the compensating gear and on the axles than it would be if the compensating gearing were located on the side of the sprocket, as in ordinary constructions.

Another object is to house the compensating gearing and to provide a novel arrangement of ball-bearings which will take up the thrust and insure a perfect and easy action of the bevel-gears and pinions and prevent any crowding and breakage thereof.

An additional object is the provision in the compensating gearing of what I shall term a "collar-wheel," which will perform a number of offices in a novel manner, such as spacing the bevel-gears and preventing any crowding action therein, retaining the roller-bearings in position and also the axles, and holding the pinion-studs in position.

A still further object is to provide in the compensating gearing a novel construction of pinion-stud as combined with the collar-wheel and the case which will prevent all sticking and afford the greatest ease in the action of the pinion, a further object being to provide oiling devices which will insure the proper lubrication of the compensating devices.

Having the foregoing objects in view, the invention consists of certain novel features and combinations of parts more fully set forth hereinafter and recited in the appended claims.

In the accompanying drawings, Figure 1 is a longitudinal section of my improved driving and compensating mechanisms; Fig. 2, an enlarged sectional detail of the parts at the center of Fig. 1, and Fig. 3 a similar view of the parts at the ends of said figure.

Portions of the vehicle-frame, which are angular in cross-section, are shown at 1 and 2 to receive the driving-boxes 3 and 4.

The numeral 6 designates a central solid axle, which is provided with ball-cones 7 on its outer ends. There are two hollow axles 8, located in longitudinal alinement and journaled in the driving-boxes. At their outer ends said hollow axles are externally recessed at 9 and internally recessed at 10, while they are similarly recessed at 11 and 12 at their inner ends. In the recesses 9 are suitably keyed the flanges 13, which are bolted to flanges 14, secured to the driving-wheels, which have balls 16 interposed between them and the cones 7. The driving-wheels are therefore free to turn on ball-bearings on the solid axle and independently of each other, the advantage of which will be apparent hereinafter. In the recesses 10, surrounding the solid axle 6, are the circular series of roller-bearings 18. The seating of the rollers in the recesses or grooves prevents their displacement in one direction, while the driving-wheels hold the rollers 17 in position, and a collar-wheel 19, located on the solid axle between the sets of rollers 18, prevents displacement of the latter. The roller-bearings reduce friction between the hollow axles and the solid axle to a minimum both when the machine is moving straight ahead and when it is being compensated, reducing friction in the compensating gearing itself and preventing all sticking and binding which would otherwise occur if the bearings were omitted.

To prevent longitudinal play of the axles and exclude dust, I provide the sleeves 20, which are located between the driving-boxes and are secured to the hollow axles by the set-screws 21, which permit of necessary adjustments. The ends of the sleeve 22 lap over or overhang the driving-boxes, and within these telescoping parts of the sleeves are ball thrust-bearings 23, which relieve end friction. The construction described excludes dust.

The collar-wheel 19 is loose on the axle 6 and is faced perfectly true at both sides and turned perfectly circular on its periphery. On opposite sides of this collar-wheel are bevel-gears 24 and 25, which are seated in the recesses 11 and keyed to the axles 8 at 26. The inner ends of the axles, the inner ends of the rollers 18, the inner ends of the keys 26, and the inner faces of the bevel-gears all abut on the smooth sides of the collar-wheel, which retains them in their proper position, so that the rollers cannot become displaced nor the keys work out nor the bevel-gears crowd in and pinch the pinions or break them.

On the hubs of the bevel-gears are the sprockets 27 and 28, between and bolted to which is a recessed band 29, of annular shape, to which a band or friction brake can be applied. The sprockets and the band constitute a case or housing for the compensating mechanism, which protects it and excludes dust. The sprockets are provided with ball thrust-bearings 30, located in recesses in their inner faces and interposed between them and the bevel-gears. These bearings allow the bevel-gear to turn without appreciable friction when compensating. The sprockets are also provided with inclined oil-cups 30, located in suitable juxtaposition to the bevel-gears and which keep the different bearings and operating-spaces properly lubricated.

In the inner face of the band 29 I provide a suitable number of stud-pockets 32—in the present instance three in number—for the reception of the ends of the pinion-studs 33, which have the heads 34, conforming to the curve of the band, while the inner ends of said studs rest loosely against the smooth periphery of the collar-wheel. On the studs are journaled the pinions 35, meshing with both bevel-gears and having their inner faces curved and conforming to the periphery of the collar-wheel. Between the heads 34 and the pinions are provided ball thrust-bearings 36, which relieve friction on the pinions. The studs are free to turn in their pockets, and the pinions are free to turn on the studs independently of the movement of the latter, and herein I obtain advantages not heretofore possible, as it is impossible for the pinions to stick, bind, or work hard, and they are always free for easy action.

By providing two sprocket-wheels disposed on opposite sides of the compensating gearing the strains are equalized during compensation and when the brake is applied and the friction is minimized, while continuous action is insured, because if one of the sprocket-chains should break the vehicle could still be operated satisfactorily with the remaining chain. At the same time the parts are all inclosed and protected from dust and injury.

Having thus described my invention, what I claim as new, and desire to secure by Letters Patent, is—

1. In a motor-vehicle, the combination with a central axle, of hollow or tubular power-axles which are independent of each other and through which the central axle passes, wheel-hubs secured to the ends of the respective hollow axles and having the central axle extending into them, antifriction-bearings interposed between the respective hollow axles and the central axle, antifriction-bearings interposed between the respective hubs and the central axle extending thereinto, and compensating mechanisms for the inner ends of said hollow axles, said hollow axles being adapted for rotation independently of the central axle, and the antifriction-bearings serving to distribute the strain between the central axle, hollow axles and hubs.

2. In a motor-vehicle, the combination with a central axle, of hollow, independent power-axles through which the central axle passes and which are rotatable independently thereof, antifriction-bearings between the hollow axles and the central axle, compensating mechanism for said hollow axles, flanges fitted over reduced or recessed ends of the hollow axles and secured thereto, wheel-hubs receiving the ends of the central axle and provided with flanges connected to those aforesaid, and antifriction-bearings interposed between the hubs and the central axle.

3. In a motor-vehicle, the combination with a central axle, of hollow, independent power-axles which receive the central axle and are rotatable independently thereof and are provided with interior recesses at their ends, constituting roller-raceways, rollers located in said raceways and interposed between the hollow axles and the central axle, wheel-hubs provided with flanges which are coupled to the ends of the hollow axles and also abut the ends of the rollers and retain them in place, and antifriction-bearings interposed between the hubs and the central axle.

4. In a motor-vehicle, the combination with a central axle, of independent, hollow axles through which the central axle passes, compensating mechanism, antifriction-bearings interposed between the hollow axles and the central axle, bearings for the respective hollow axles, and sleeves secured on the hollow axles and abutting the bearings last named, said sleeves preventing end play of said hollow axles.

5. In a motor-vehicle, the combination with a central axle, of independent, hollow axles through which the central axle passes, compensating mechanism, antifriction-bearings interposed between the hollow axles and the central axle, bearings for the respective hollow axles, sleeves on said hollow axles which abut the bearings, and means for securing said sleeves to the hollow axles in an adjustable manner.

6. In a motor-vehicle, the combination with a central axle, of independent, hollow axles through which the central axle passes, compensating mechanism, antifriction-bearings interposed between the hollow axles and the central axle, bearings for the respective hollow axles, sleeves on said hollow axles which have their ends abutting the bearings, and set-screws for adjustably clamping the sleeves to the hollow axles.

7. In a motor-vehicle, the combination with a central axle, of independent, hollow axles through which the central axle passes, compensating mechanism, antifriction-bearings interposed between the hollow axles and the central axle, bearings for the respective hollow axles, sleeves on said hollow axles which have recessed ends which overhang or overlap the bearings last named, and are secured to the axles, and thrust-bearings located in the recessed ends of the sleeves.

8. In a motor-vehicle, the combination with a central axle, of hollow axles through which the central axle passes, a collar-wheel located on the central axle and between the adjacent ends of the hollow axles, said hollow axles being internally recessed at their said adjacent ends, rollers located in said recesses and interposed between the hollow axles and the central axle and having their ends abutting on the collar-wheel, and compensating mechanism.

9. In a motor-vehicle, the combination with a central axle, of hollow axles through which the central axle passes, said hollow axles being internally recessed at both ends, rollers located in said recesses and bearing on the central axle, a collar-wheel on the central axle and between the adjacent ends of the hollow axles and which forms an abutment for them and for the roller-bearings thereat, wheels having hubs which are connected to the outer ends of the hollow axles by flanges which form an abutment for the rollers at said ends of the hollow axles, and bearings for the hollow axles, and compensating mechanism.

10. In a motor-vehicle, the combination with a central axle, of independent, hollow axles through which the central axle passes, antifriction-bearings interposed between the hollow axles and the central axle, bevel-gears secured to the adjacent ends of the hollow axles, a power-transmitting wheel and pinions carried thereby which mesh with the bevel-gear, and a collar-wheel on the central axle and interposed between the adjacent ends of the hollow axles and between the bevel-gears, said collar-wheel preventing the gears from crowding the pinions.

11. In a motor-vehicle, the combination with a central axle, of hollow axles which receive the central axle, bevel-gears carried by said hollow axles, a rotary power-transmitting device, pinion-studs carried by said rotary device, pinions on the studs which mesh with the bevel-gears, and a collar-wheel located on the central axle and between the bevel-gear which has its periphery abutting the inner ends of the pinion-studs.

12. In a motor-vehicle, the combination with a central axle, of hollow axles which receive the central axle, bevel-gears secured to the said hollow axles, a rotary power-transmitting device, a collar-wheel on the central axle and between the bevel-gears, pinion-studs having one end loosely seated in a socket in the rotary power-transmitting device and the other end abutting the periphery of the collar-wheel, and pinions loosely mounted on said studs which mesh with the bevel-gears.

13. In a motor-vehicle, the combination with a central axle, of hollow axles which receive the central axle, bevel-gears secured to said hollow axle, a rotary power-transmitting device having pinion-stud sockets, pinion-studs having heads and provided with ends which are loosely seated in said sockets, pinions loosely mounted on said studs and meshing with the gears, thrust-bearings interposed between the pinions and the heads, and a collar-wheel on the central axle and between the gears which forms a support for the inner ends of the pinion-studs.

14. In a motor-vehicle, the combination with independent axles, of bevel-gears secured thereto, a rotary casing inclosing the bevel-gears and mounted to turn on said gears as a bearing and movable independently thereof, thrust-bearings interposed between the sides of the casing the bevel-gears, pinions carried by the casing which mesh with the bevel-gears, and power-gearing on said casing.

15. In a motor-vehicle, the combination with independent axles and bevel-gears carried thereby, of gear-wheels located at the sides of the bevel-gears and free for independent movement therefrom, an annular brake band or rim permanently secured to both of said last-named gear-wheels and interposed between them and which is movable with both of said gear-wheels at all times, and pinions carried by the band which mesh with the bevel-gears, said gear-wheels being adapted for use simultaneously to equalize the strain on the gearing driven by them.

16. A compensating gear comprising a rotary, power-transmitting gear, pinion-studs carried thereby which are rotatable on their own axes, pinions mounted loosely on said studs and rotatable independently thereof, and bevel-gears meshing with the pinions and rotatable independently of each other.

17. A compensating gear comprising a rotary, power-transmitting gear-wheel, pinion-studs carried thereby which are rotatable on their own axes, pinions loosely mounted on said studs rotatable independently thereof, independently-rotatable bevel-gears meshing with the pinions, and a collar-wheel located between the bevel-gears and having its periphery abutting the inner ends of the pinion-studs.

In testimony whereof I affix my signature in presence of two witnesses.

ROBERT H. CLOUGHLEY.

Witnesses:
ALEXANDER WIRTH,
ALBERT A. TALBOTT.